United States Patent [19]
Garman

[11] 3,768,878
[45] Oct. 30, 1973

[54] TORSION BAR RECOIL AND ADJUSTER MECHANISM

[75] Inventor: James A. Garman, Eureka, Ill.

[73] Assignee: Caterpillar Tractor Co., Peoria, Ill.

[22] Filed: Jan. 21, 1972

[21] Appl. No.: 219,755

[52] U.S. Cl. ............................................. 305/31
[51] Int. Cl. .......................................... B62d 55/30
[58] Field of Search ............... 305/31, 32; 180/9.6, 180/9.58

[56] References Cited
UNITED STATES PATENTS

| | | | |
|---|---|---|---|
| 2,917,346 | 12/1959 | Christensen | 305/31 |
| 2,846,276 | 8/1958 | Hendrikson | 305/32 |
| 2,326,486 | 8/1943 | Norelius | 305/31 |
| 1,442,568 | 1/1923 | Holt | 180/9.6 |

FOREIGN PATENTS OR APPLICATIONS 738,007  7/1943  Germany ........................ 305/32

Primary Examiner—Richard J. Johnson
Attorney—Warren J. Krauss

[57] ABSTRACT

A torsion bar recoil and adjuster mechanism for the track of a crawler-type vehicle. The mechanism includes a pair of spaced-apart, parallel torsion bars connected to an idler wheel carrying yoke member. Means are provided for the selective adjustment of the tension provided in said track as well as for absorbing recoil forces in said track.

7 Claims, 4 Drawing Figures

Patented Oct. 30, 1973
3,768,878
2 Sheets-Sheet 1
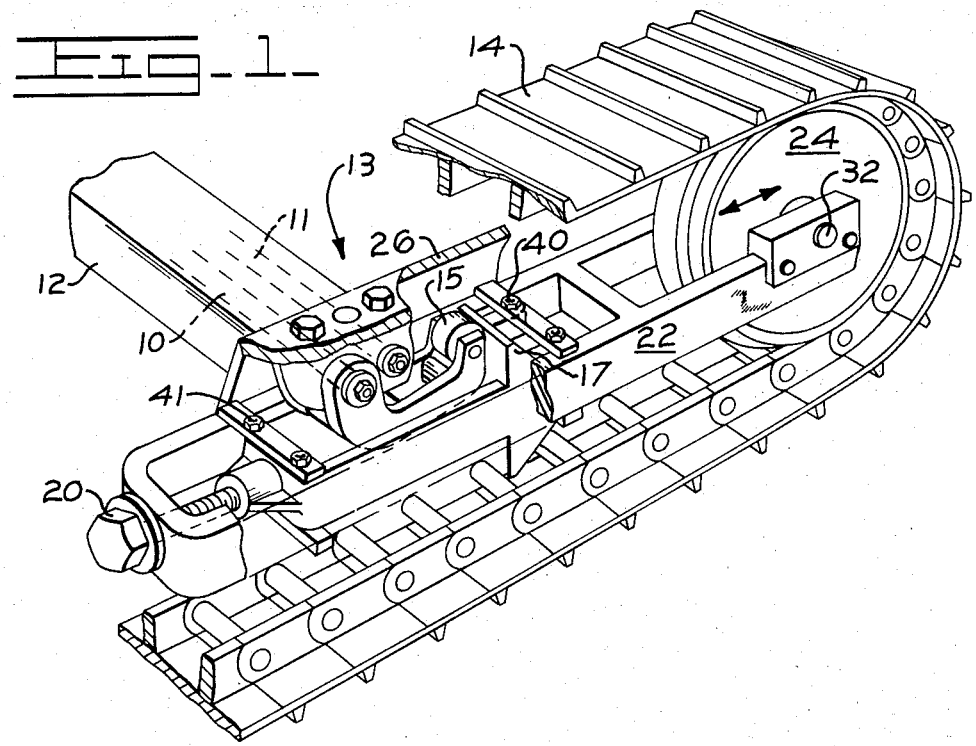
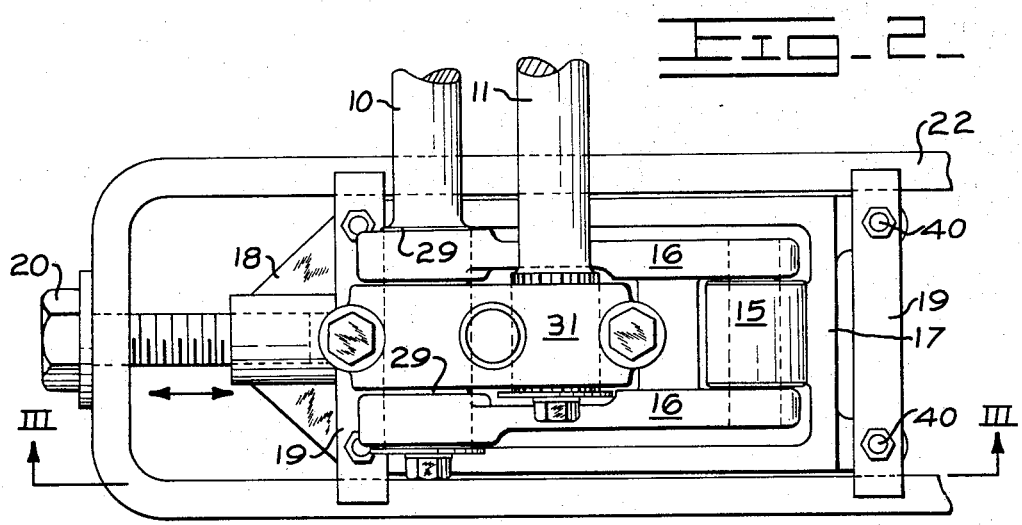

Patented Oct. 30, 1973
3,768,878
2 Sheets-Sheet 2
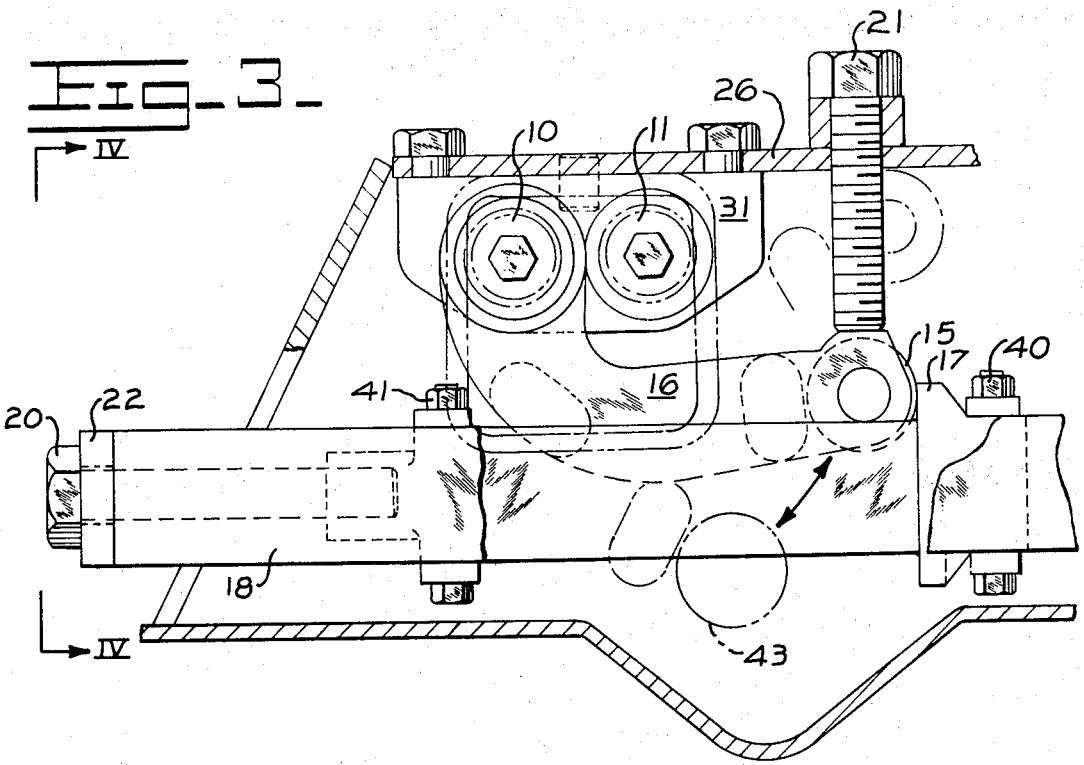
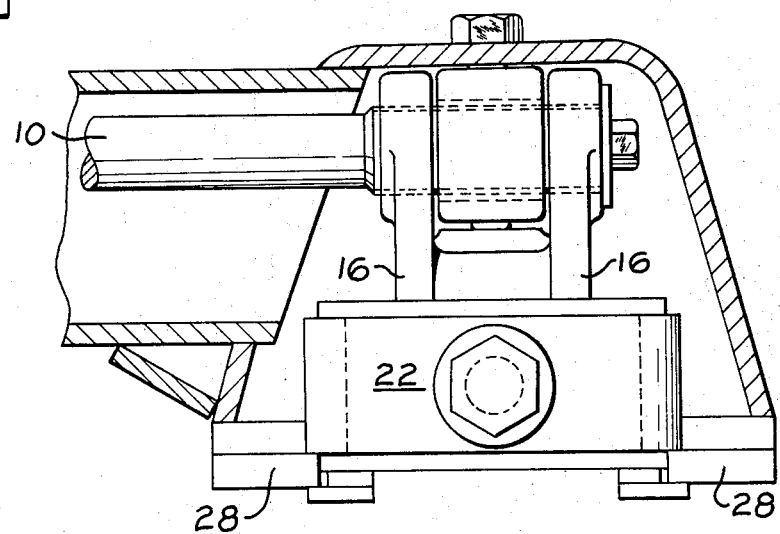

TORSION BAR RECOIL AND ADJUSTER MECHANISM

BACKGROUND OF THE INVENTION

This invention relates to a new and improved recoil and adjuster system for endless chains on earthmover vehicles. More particularly, the invention is directed to a novel system which utilizes a pair of torsion bars and lever arms to provide proper tensioning and recoil absorption for the tracks of a crawler-type vehicle.

In rough terrain applications, crawler-type earthworking vehicles experience sudden impact loading which can cause severe damage to the track components unless means are provided to absorb track recoil and to cushion the system. Also, under these conditions, normal wear on rollers, idler wheels and other components will decrease the tension in the track and adjustment will be required while in the field.

In the past, compression coil springs have been utilized in combination with a movable idler wheel as track recoil means. While the mechanical spring system has been somewhat successful in absorbing recoil, it has proven to be an extremely difficult system to adjust, particularly while in the field. The springs, sometimes preloaded to a force of approximately forty tons, require special tools for adjustment and present a hazard if the energy therein is accidentally released during maintenance.

Another type of recoil means utilizes a piston and a compressed gas cylinder or accumulator in place of the aforementioned mechanical spring and also uses an incompressible fluid system to provide facile adjustment of track tension. Such a system is shown in U. S. Pat. application Ser. No. 80,680 to Alexander, filed Oct. 14, 1970, now U.S. Pat. No. 3,692,368, of common assignment herewith.

This invention is principally directed to a recoil and adjuster system which does not use mechanical springs or compressed fluid, but rather utilizes torque forces stored in torsion bar means to provide biasing for recoil accommodation and adjustment purposes.

One of the objects of this invention is to provide a track recoil and adjuster system which utilizes a yoke member, which member supports an idler wheel, an adjustable actuating member, and a torsion bar having a lever arm for engaging a portion of said actuating member whereby the torsion bar is preloaded to act through said lever arm upon said actuating member to adjustably bias and provide recoil accommodation for said idler wheel.

Another object of this invention is to provide a track recoil and adjuster system which is readily adjusted in the field.

Still another object of this invention is to provide a torsion bar-type recoil and adjuster system for the track of a crawler vehicle wherein one end of the torsion bar extends laterally from one idler yoke to an oppositely-disposed, complementary track-supporting roller frame to which the other end of the torsion bar is rigidly fixed.

Yet another object of the invention is to provide a track recoil and adjuster system wherein two torsion bars are provided in parallel, spaced-apart relationship and extend laterally across a crawler vehicle to provide adjustable tensioning and recoil accommodation for each of the tracks of the vehicle and wherein each torsion bar, which provides biasing for one track, is rigidly fixed to a portion of the opposite side of the vehicle.

Another object is to provide such a system wherein said parallel-disposed, spaced-apart torsion bars are protectively enclosed by a channel member which extends transversely across the vehicle.

Other objects and advantages of the present invention will become apparent from the following description and claims.

The accompanying drawings show the preferred embodiments of the present invention and the principles thereof which are considered to be the best mode contemplated for utilizing these embodiments. It should be recognized that other embodiments of the invention, utilizing the same or equivalent principles, may be used and structural changes may be made as desired by those skilled in the art without departing from the spirit of the present invention.

BRIEF DESCRIPTION OF THE DRAWINGS

FIG. 1 is an isometric, side elevational view of the track assembly of a crawler vehicle with portions broken away to show the recoil and adjuster mechanism of the present invention in its operative orientation;

FIG. 2 is a plan view of the instant recoil and adjuster mechanism;

FIG. 3 is an enlarged elevational view of the recoil and adjuster mechanism of the present invention taken along the Line III—III of FIG. 2; and FIG. 4 is an end view of the instant recoil and adjuster mechanism taken along the Line IV—IV of FIG. 3, with portions broken away for illustrative purposes.

DETAILED DESCRIPTION

FIG. 1 shows the track assembly of a crawler vehicle equipped with the novel recoil and adjuster mechanism. A track 14 is driven by a rearwardly-disposed sprocket wheel (not shown) which wheel is carried on a rearward portion of a roller frame 26 and is supported at the front of the vehicle by an idler wheel 24. The track recoil and adjuster mechanism of the present invention is shown generally at 13.

The elements shown in FIG. 1 comprise one of two track assemblies normally utilized on such crawler vehicles. It should be understood that a mirror image of the track assembly shown exists on the opposite side of the vehicle. This is not shown in the drawings inasmuch as it would represent a mere duplication of the parts already depicted.

By further reference to the other figures of the drawings, it will be noted that the idler wheel 24 is rotatably supported on a shaft 32 which shaft is journalled in a yoke member 22. The yoke member is movable with respect to the roller frame 26 as is the idler wheel. A channel member 12 is rigidly connected to said roller frame 26 and extends transversely across the crawler vehicle and is rigidly secured to the roller frame on the opposite side. Within the channel member 12 are disposed a pair of torsion bars 10 and 11. The torsion bar 10 is splined at 29 to a pair of lever arm members or bell cranks 16 as shown. Rotatably supported upon a distal portion of the bell cranks is a roller member 15 which engages a plate member 17 which plate member is rigidly fixed to the yoke member 22 by means of fasteners 40. The plate member 17 is part of an intermediate idler bracket 18 which is slide mounted upon the yoke member by a plurality of cross bars 19.

As is apparent from the drawings, movement of the idler wheel 24 in a direction of the arrows shown in FIG. 1 will displace the bell cranks 16 downwardly and upwardly as shown by the arrows in FIG. 3. Such movement will wind and unwind, respectively, the torsion bar 10 thus increasing or decreasing the potential energy stored therein. Such movement of the idler wheel 24 would occur during recoil caused by an impact engagement by the forward portion of the track with rough terrain, debris or the like.

As shown in the drawings, the torsion bar 11 is rigidly fixed against rotation in the portion 31 of the roller frame 26. On the opposite side of the vehicle from that shown in FIG. 1, the torsion bar 10 is fixed in a like manner within a portion of the opposite roller frame (not shown).

An adjusting screw means 20 is provided for the purpose of adjusting the amount of tension in the crawler track. The screw means 20, when tightened, causes the intermediate idler bracket 18 to move toward the left, as shown in FIG. 2, and to load the torsion bar 10 to a selected degree. The torsion bar 10 will then, through the bell crank 16 and roller member 15, exert a predetermined biasing force upon the plate member 17 to force it toward the right, as shown in FIG. 2, to provide a given tension in the track 14.

Also provided is an adjusting screw member 21. As shown in FIG. 3, this member engages a portion of one of the bell cranks 16 and acts as a limit stop means to prevent, to a selected extent, the upward movement of the bell cranks 16 and consequently unwinding of the torsion bar 10. The screw adjustment means 20 and 21 together with the fastening means 40 and 41 provide means to assure the proper positioning and tensioning of the idler wheel and yoke assemblage upon the crawler vehicle. The entire idler wheel and yoke assemblage is movably supported within the roller frame structure by means of a conventional idler wheel slide guide system such as is shown at 28 in FIG. 4.

With reference now to FIG. 3, it can be seen that upon rearward movement of the idler wheel and yoke member assemblage, the bell cranks 16 will be moved downwardly toward the position shown in phantom at 43 thus flexing or winding the torsion bar 10 and providing an accommodation for idler wheel recoil as well as proper tensioning of the track.

It should also be noted that adjustment of the system can be readily done in the field with a minimum of labor and tools. Replacement or repair of parts can be easily accomplished after the biasing forces in the torsion bars have been reduced by means of the adjustment screw means.

It should be noted that although the novel recoil and adjuster system of the present invention has been described herein in relation to a crawler vehicle, it is apparent that such a system has utility in other types of arrangements wherein recoil and tension adjustment means are required. It should also be noted that, in some instances, it might be possible to utilize a torsion spring or other torque-transmitting device in lieu of a torsion bar.

While the preferred embodiments of the invention have been illustrated and described, it is understood that these embodiments are capable of variation and modification and are not limited to the precise details set forth but rather include such modifications and variations as fall within the scope of the appended claims.

I claim:

1. A recoil and tension adjuster mechanism for the track of a crawler vehicle having two roller frames disposed at opposite sides of said vehicle comprising; first frame means for rotatably supporting an idler wheel for said track, second frame means adjustably slidably disposed upon said first frame means, first adjustment means connected between said first and second frame means for selectively altering the position of said first frame means with respect to said second frame means, torque transmitting and storing means including at least one torsion bar in movable engagement with said second frame means, said second frame means including a plate member, said torque transmitting and storing means including a rotatable member, said plate member and said rotatable member being in constant engagement, whereby torque forces transmitted by said torque transmitting and storing means are communicated through said rotatable member to said plate member and from said plate member to said first frame means, and from said first frame means to said idler wheel and track, said at least one torsion bar member extending transversely across said vehicle and having first and second end portions, and a lever arm member fixedly attached to one of said first and second end portions, said other of said first and second end portions being firmly attached to the transversely oppositely disposed one of said two roller frames.

2. The invention of claim 1 wherein said rotatable member is journalled for rotation in a portion of said lever arm member.

3. The invention of claim 1 wherein second adjustment means are provided on a fixed portion of said crawler vehicle for engaging and selectively adjusting the position of said lever arm member.

4. The invention of claim 1 wherein said adjustment means include a screw member which engages said other end of said lever member.

5. The invention of claim 4 wherein said adjustment means further includes a means for selectively varying the position of said first frame means with respect to said second frame means while simultaneously varying the amount of said biasing force.

6. In a crawler vehicle having a pair of tracks mounted upon roller frames on opposite sides of said vehicle, a track recoil device comprising; torque transmitting and storing means including at least one torsion bar for applying track tensioning force to each of said pair of tracks, said torque transmitting and storing means acting to absorb recoil forces transmitted by said tracks, said at least one torsion bar being fixed to a portion of one of said roller frames and extending transversely across said crawler vehicle to the track supported by the other of said pair of roller frames to apply tensioning force to said track, said at least one torsion bar is protectively enclosed by a portion of said crawler vehicle.

7. The invention of claim 6 wherein there are two torsion bars and wherein each extends transversely across said vehicle in spaced-apart, parallel relation to the other and wherein said two torsion bars are protectively enclosed by a channel-like portion of said crawler vehicle.

* * * * *